May 25, 1965 A. R. MAXEY 3,185,400

TAPE SLACK DEVICE

Filed Dec. 28, 1961 3 Sheets-Sheet 1

ALEXANDER R. MAXEY
INVENTOR.

BY Robert G. Clay

ATTORNEY

ALEXANDER R. MAXEY
INVENTOR.

BY Robert G. Clay

ATTORNEY

May 25, 1965 A. R. MAXEY 3,185,400

TAPE SLACK DEVICE

Filed Dec. 28, 1961 3 Sheets-Sheet 3

ALEXANDER R. MAXEY
INVENTOR.

BY Robert G. Clay

ATTORNEY

United States Patent Office 3,185,400
Patented May 25, 1965

3,185,400
TAPE SLACK DEVICE
Alexander R. Maxey, Redwood City, Calif., assignor to Ampex Corporation, Redwood City, Calif., a corporation of California
Filed Dec. 28, 1961, Ser. No. 162,883
9 Claims. (Cl. 242—55.12)

This invention relates to tape transports, and particularly to apparatus for maintaining slack segments in the tape thereof.

In the high speed magnetic tape transport art, U-shaped slack loops (so-called) are employed between the reels and the transducing heads to enable the quick starting, stopping and reversing of the portion of tape at the heads. The massive reels are not capable of being started, stopped and reversed as quickly as the comparatively weightless segment of tape at the heads, which is moved directly by a capstan; and the differentials of acceleration and deceleration are absorbed by the slack loops. When the tape is started, the takeup reel slack loop temporarily grows longer and the supply reel slack loop grows shorter, both loops being restored to normal length when the reels attain operating velocity. In stopping, it is the takeup reel loop that grows shorter and the supply reel loop that grows longer.

Slack loops previously known have not provided true slack, because there always exists a need for maintaining tension in the tape across the heads, and previous devices have maintained this tension by applying pulling force in some manner to the bends of the loops. Compliance arms have been used, as well as air pressure differential columns in which the air in the bend is maintained at greater pressure than the air outside the bend. As a result, whenever the loop is shortened, the compliance arm or the mass of air within the bend has to be moved. The mass has to be resiliently compressed and/or bodily displaced by the tape itself, and the tape is temporarily stretched in such a way as to undesirably lengthen the wave-length of the signal on the tape at the heads. If on the other hand the tape speed is reduced to avoid this deformation, the result is an undesirable delay in the response of the device. Analogous phenomena occur at the end of a loop-lengthening operation, when the mass within the loop bend has to be decelerated.

Accordingly, it is an object of this invention to provide apparatus for maintaining a truly slack segment in the mid-portion of a tensioned tape, with a minimum mass of material linked with the bends of the segment to resist shortening of the segment.

It is a further object of the invention to provide a slack segment as above described, while yet maintaining a required tension in the tape outside the segment, especially during the lengthwise running of the tape through the segment, and particularly during shortening and lengthening of the segment.

These and other objects are attained in a structure in which the tape slack segment is held in an anfractuous or sinuously folded condition, so that a plurality of bends are formed. Thus, during the greater part of the shortening of the loop the only air mass that needs to be displaced and accelerated is the mass linked with the bend nearest the more rapidly running portion of tape. By this folded arrangement the shanks or parallel portions of all the bends are crowded together, so that the bend nearest the more rapidly running portion of tape encloses a minimum quantity of air. The folded portion of the segment is enclosed in a box from which the air is pumped in a lateral direction, further reducing the quantity of air enclosed by the bends. Tension in the tape outside the segment is maintained by directing a flow of air against both sides of the tape at both shanks and toward the midpoint of the segment, the air flow being of sufficient pressure and velocity to maintain a suitable tensioning drag on the tape outside the segment and to relieve the segment itself from any need to be kept under tension. Thus when the segment is shortened, substantially no air is caught up in the shortening bend, and stretching of the tape at the transducing heads is avoided. Furthermore, the frictional drag produced by the air flow on the shanks of the segment is not altered during the process, and the tension outside the segment remains constant. The device is also arranged for easy threading and removal of the tape therefrom.

Other objects and advantages of the present invention will be readily apparent from the following description and claims considered together with the accompanying drawing, in which:

Figure 1:
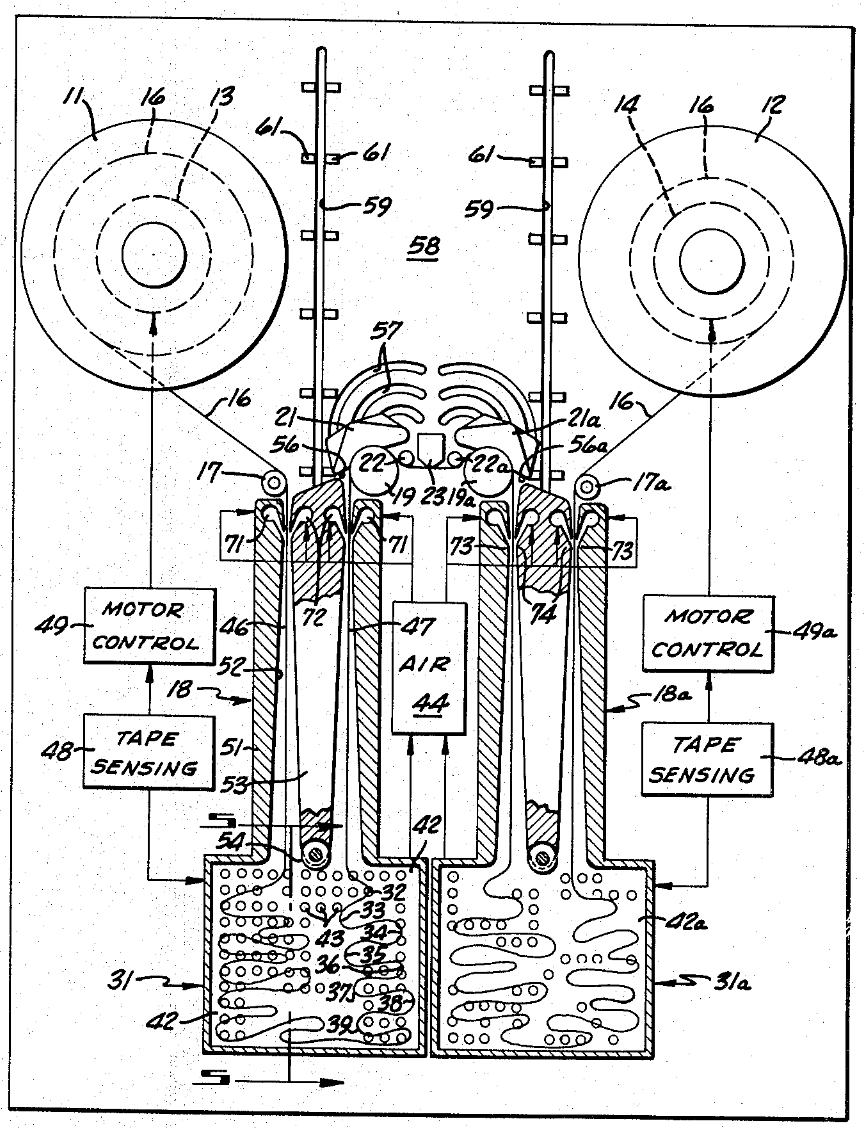
FIGURE 1 is a front elevation view, broken away and partly schematic, of a tape transport utilizing the apparatus of the invention.

Referring now to FIGURE 1 there is shown a typical tape transport including a supply reel 11 and takeup reel 12 operated by motors 13 and 14 respectively, and serving as winding, storage and transport means for a magnetic tape 16. The tape 16 leaving the supply reel 11 passes over a guide element 17, and into a tensioning and slack maintaining means 18 that is constructed in accordance with the invention and is further described below. Leaving the device 18, the tape passes between a pneumatic capstan 19 and female guide 21, around a guide member 22, and past a magnetic transducing head assembly 23. The tape then passes around and through elements **22*a*, 21*a*, 19*a*, 18*a* and 17*a*, similar to the correspondingly numbered elements already described, and to the takeup reel 12. Capstans 19 and 19*a* do not form part of the present invention, but are described as follows. Capstan 19 is continuously rotating in a counter-clockwise direction, and during forward movement of the tape (to the right of the drawing), air is forced radially outwardly from the capstan to float the tape frictionlessly thereon. Meanwhile the capstan 19*a* is continuously rotating in a clockwise direction and is also outwardly pressurized, but the tape is frictionally engaged with the capstan 19*a* as by means of an overwhelming pressure of air directed thereagainst from the female guide 21*a*. Thus the capstan 19*a* serves to pull the tape past the transducing heads 23. In reverse operation of the machine, the air pressure is removed from female guide 21*a* and is applied to female guide 21 so that the tape floats on capstan 19*a* and is engaged with capstan 19**.

Now it will be seen that when the tape is first started in a forward direction as by engagement with captan **19*a*, the segment of tape between the capstans accelerates much more rapidly than the portions of tape coming from the supply reel 11 and going onto the takeup reel 12. This effect is unavoidable and is brought about because the mass of tape at the heads is very much less than the combined masses of the reels and the tape wound upon the reels. As a result of the temporary speed differential, the length of the tape segment in the takeup reel tensioning and slack maintaining means 18*a*** grows temporarily longer, and the length of the segment in the supply reel means 18 grows temporarily shorter. When the motors 13 and 14 have accelerated to operating velocity, or slightly overspeed, the lengths of the segments are restored to their desired optimum values, and then the motors are automatically slowed to true operating velocity to maintain the segments at these lengths.

It will be understood that the initial acceleration of the tape to full operating speed across the transducing heads 23 is extremely rapid, and is followed by a comparatively long period during which the reels are brought up to speed while the slack segments lengthen and shorten, respectively. During the initial shortening of the slack segment in device 18, any air that is caught up by the bends of the segment tends to impose undesirable stretching forces on the tape at the heads 23. With tape loop maintaining devices as previously known in the art, the loop is generally disposed in a single elongated bend, the tension of which is maintained by means of a compliance arm or by a differential pressure of air positively applied to the inner portion of the bend. Thus during shortening of the supply reel loop, the compliance arm or all of the air in the bend of the loop must be accelerated and displaced, or resiliently compressed, and the tape at the heads is stretched.

In the present invention this problem is partly overcome by disposing the slack segment in an anfractuous or sinuously folded condition within a box 31, so as to form a plurality of bends 32, 33, 34, 35, 36, 37, 38, and 39, for example. After the initial shock of acceleration has brought the tape at heads 23 to operating speed, and during the remainder of the period needed to bring the tape coming from supply reel 11 to this same operating speed, most of the bends 32–39 are effectively motionless in the box 31, for although some motion may continue in all of the folds, the amount of motion involved is not important and has little effect in stretching the tape. However, new folds are successively added on the input side of the box and at the same time the folds nearest the output side are completely collapsed by withdrawal of tape in the direction of the heads. Normally the first fold to be eliminated is that corresponding with bend 32, then bend 33, and so on. As bend 32 is shortened and eliminated, the air enclosed by the bend is displaced. It will be seen, however, that with the tape folds crowded together as they are in the box, the shanks of bend 32 are nearly contiguous, and enclose an extremely small quantity of air. The first principle by which the displaceable air is reduced in the present invention is therefore the flattening of the shortening fold so that the shanks thereof are contiguous; and this result is accomplished by the described arrangement, wherein the slack segment is arranged in multiply folded condition with the folds crowded closely together.

As another important feature of the invention, the air that is enclosed by the bends 32–39 is further reduced as by means of withdrawing air laterally from box 31. As shown, the side walls 42 of the box are provided with a plurality of vents 43 spaced over the entire expanse of each wall. The air in the box is withdrawn through these vents as by means of an air pressure-vacuum differential device 44.

It is noted that, besides reducing the amount of air, the withdrawal of air laterally past the edges of the tape has the effect of giving a preferred direction of displacement to any air that actually is displaced by movement of the bend 32. In other words, the displaced air is predisposed to move laterally and to more quickly escape the moving bend 32. If this air were impelled only by the moving bend, the initial direction of movement would be the same as the direction of movement of the bend; and a certain amount of compression would take place before the air could be diverted laterally, with the result that greater stretching forces would be applied to the tape.

To maintain the necessary tension in the segment of tape between the capstans, and to continue pulling tape into the means 18 from the supply reel 11, the air pressure-suction device 44 supplies pressurized air to the upper portion of the device 18, the air being directed against both sides of the tape in both shanks 46 and 47 of the slack segment. The air impinging on both shanks is directed downwardly and into the box 31 so as to exert a frictional pull on shank 46 and a frictional drag on shank 47. The details of this arrangement will be explained more fully hereinafter.

As a further important feature, the length of tape in the slack segment is maintained at or near a constant value by means of a tape sensing apparatus 48 that controls a motor control apparatus 49 to vary the operation of the supply reel motor 13. The tape sensing device 48 may be any one of several types well known in the art. One such device, employing photoelectric cells to sense the total amount of tape in the storage box, is disclosed in U.S. Patent No. 2,960,611 issued to Namenyi-Katz. Other such devices known in the art include devices for weighing the total amount of tape in the storage box, and devices employing ultrasonic transducers to provide a continuous indication of the amount of tape in the box. In operation, the tape sensing apparatus 48 senses the shortening of the loop by sensing when the total amount of tape in the box is less than a selected optimum value. A signal is transmitted from the device 48 to the motor control apparatus 49 to cause the motor 13 to accelerate to a predetermined overspeed until enough tape has been fed into the box to restore the total amount to the optimum value. When the amount of tape in the box exceeds the optimum value, the tape sensing device 48 provides a signal to the motor control apparatus to perform any of a number of possible corrective actions. For example, the motor 13 can be caused to be immediately slowed down or stopped, or even reversed to reduce the amount of tape in the box, or the corrective action can be postponed until the next starting of the tape either in the forward or reverse direction. Similar slack storage, sensing and control apparatus is provided for the takeup reel device 18*a* and operates in an analogous manner to tension and maintain the length of loop in this device at a similar optimum value.

Figure 2:
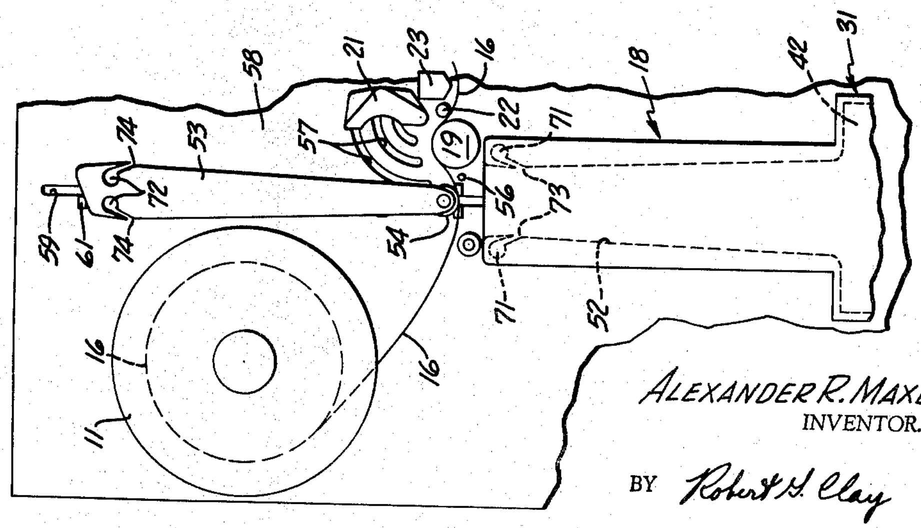
FIGURE 2 is a fragmentary front elevation view of a portion of the apparatus shown in FIGURE 1 in a position of readiness for threading of the tape.

Referring now to FIGURE 2, the structure of the means 18 and the disposition and operation of the device during initial threading of the tape 16 is illustrated. The upper portion of the means 18 includes a housing 51 defining an elongated interior cavity 52 that is open at both ends. A slidable central island member 53 is arranged to be insertable within the cavity 52, but is shown in FIGURE 2 as withdrawn therefrom primarily to aid threading of the tape. The lower end of the member 53 has idler roller 54 mounted thereon, and during the threading process the tape 16 is arranged as shown between the guide 17 and capstan 19 and the idler roller 54. The member 53 is then moved downwardly to from a bend in the tape between the guide 17 and capstan 19 and to push the bend into the cavity 52 and beyond to the position illustrated in FIGURE 1. Thereupon, preliminary rotation of the supply reel 11 causes more tape to be fed into the cavity 52 so as to provide the folded disposition of a loop in the box 31 as previously described. It will be seen that the female guide 21 is pivoted to a withdrawn position during the threading process (FIGURE 2) and is pivoted to an operating position engaging a stud member 56 after the member 53 is inserted (FIGURE 1). A set of curved slots 57 is provided in the top plate 58 to accommodate various portions of the female guide 21 that extend behind the top plate. Another slot 59 is pivoted in the top plate 58 to serve as part of the track for the sliding of member 53 and a number of rollers 61 are mounted along the sides of track 59 to support the member 53 in movement.

Figure 3:
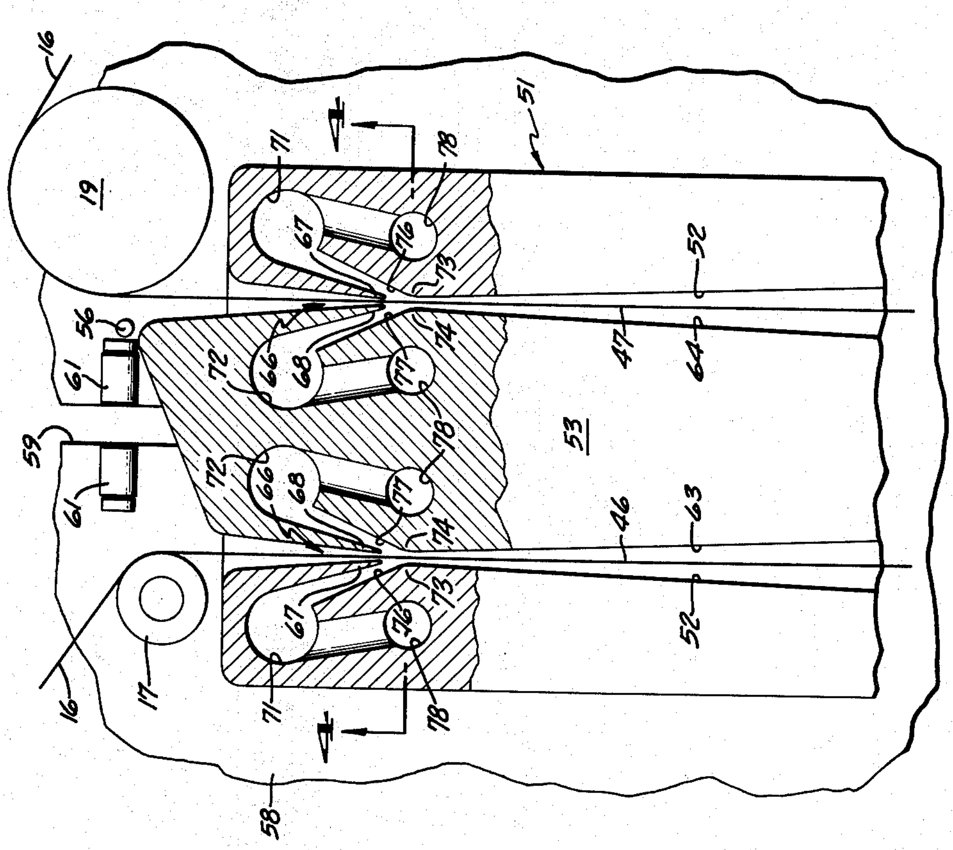
FIGURE 3 is a fragmentary elevation view, broken away and to an enlarged scale, illustrating the position of the mechanism in a further stage of tape threading.
Figure 4:
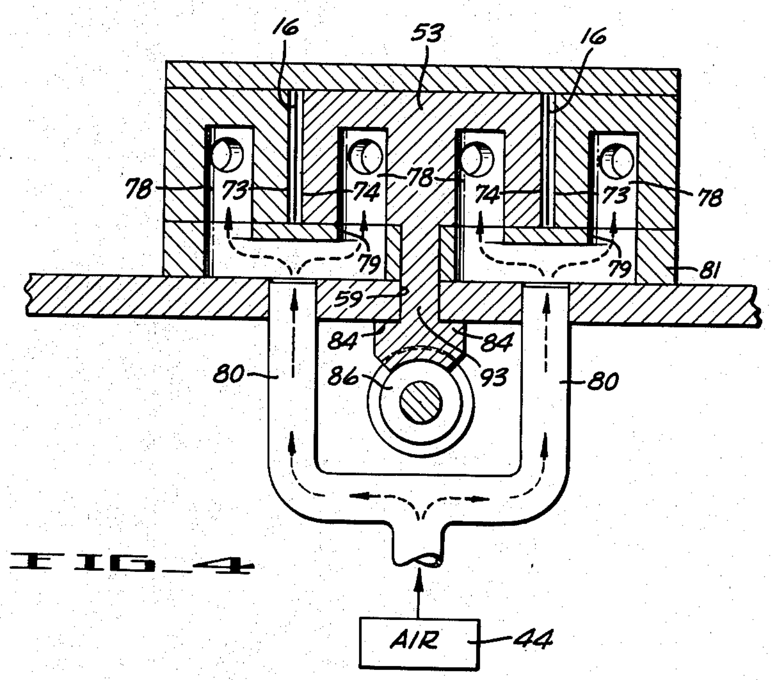
FIGURE 4 is a cross-sectional view, partly schematic, taken substantially on the plane of lines 4—4 of FIGURE 3.

Referring now to FIGURES 3 and 4 the air pressure arrangement for maintaining tension in the tape outside the slack segment is illustrated. It will be seen that the central island member 53 in the inserted position in housing 51 defines with the housing a pair of elongated parallel channels 63 and 64 enclosing the two shanks 46 and 47 of the tape loop. Each of the channels has a threshold 66 defined by a pair of inwardly extending confronting lips 67 and 68 pivoted on the housing 51 and member 53 respectively. These lips 67 and 68 are spaced apart for a distance only slightly greater than the thickness of the tape 16 so that the threshold in effect fits around and conforms to the shanks and forms an effective seal against the passage of air between the housing and shanks in an outward and upward direction. These lips 67 and 68 also operate to strip off electrostatic charges that accumulate on the tape. Immediately within the thresholds 66, each channel is provided with a pair of side chambers 71 and 72 in the housing and member 53 respectively. Further downwardly and inwardly, each channel is narrowed to define the neck 73–74 of a Venturi passage, and each channel is shaped in gradually diverging form further inwardly and downwardly toward the end of the channel that communicates with the box 31.

To direct pressurized air from chambers 71–72 against both sides of the tape, a pair of confronting nozzle openings 76 and 77 are provided opening from the chambers 71–72 and directed downwardly and toward the interposed tape shank 46 (47). As shown in FIGURE 4, each of the chambers 71–72 is connected to a suitable conduit 78 for coupling to the source of air pressure 44. Because the member 53 is movable with respect to the housing 51, the ends of the openings 78 in member 53 are caused to register with openings 79 formed in a back plate 81 of the housing 51 and communicating with tubing 80 mounted in the top plate 58 of the transport. Suitable vacuum seals may be provided at the points of registration, but are not here illustrated. The air conduits are continued through tubing 80 to source 44.

It will be seen that the pressurized air entering the channel 63 (64) through the openings 76–77 is deflected by the lips 67–68 and directed downwardly along both sides of the tape shank 46 (47). Some slight leakage of air upwardly past the lips 67–68 is tolerable, but in general it will be understood that the same quantity of air is introduced into the channel through the openings 76–77 as is subsequently removed from the channels by action of the vacuum side of the apparatus 44 through the vents 43 and box 31. Thus in effect the air circulation system is a closed system and whatever quantity of air leaks out must also leak back in at some point, the leakage being comparatively negligible. Alternatively, the apparatus 44 may be arranged to remove a greater quantity of air from the box 31 than it introduces through the openings 76–77, ensuring that leakage at the lips 67–68 is always inward. The pressurized air flowing downwardly past the Venturi neck 73–74 of the channel is further compressed so as to cause the downward drag upon the tape shank 46 (47) that is needed to maintain the tension on the tape outside the device. After passing the neck 73–74 the air gradually expands in the diverging channel until it reaches the box 31, where a further expansion results before the air is withdrawn through the vents 43. It is noted that an advantageous feature of this arrangement is that the pressurized air is introduced to both sides of the tape in such a manner that no matter how the tape may move from side to side in the course of its transport, the tape can never collapse completely against one side of the channel or the other, or at least cannot so collapse without trapping sufficient pressurized air to immediately restore the tape toward the center of the channel. Thus frictional engagement or clamping of the tape against the sides of the channel is avoided.

As above described, the air pressure suction device 44 is represented as having its high pressure side coupled to the openings 76–77 and its low pressure side coupled to the vents 43 in the box 31, so that both pressure and vacuum are applied to the system at opposite ends, and the quantity of air withdrawn is always substantially equal to the quantity introduced. Alternatively, however, the apparatus operates satisfactorily when only the high pressure side of the apparatus 44 is coupled to the openings 76–77, and the vents 43 are open to ambient atmosphere. Alternatively also the apparatus functions satisfactorily if the openings 76–77 themselves are coupled to ambient atmospheric pressure while the vents 43 are coupled to the low pressure or vacuum side of the apparatus 44.

In FIGURE 4, the means for causing sliding motion of the member 53 is also illustrated. The back plate 81 of the housing 51, and the adjacent top plate 58 of the transport, have the slot 59 formed therein. The member 53 has a rearwardly extending flange 83 protruding through the slot 59 and terminating inwardly in a pair of overlapping lips 84 engaging the back side of the top plate 58. Thus the member 53 is secured for longitudinal sliding motion in the slot 59. The lip portion 84 of the member is toothed to form a rack that is engaged by a worm gear 86. Suitable motor means, not here shown, are coupled to the gear 86 for causing sliding motion of the member 53.

It will be noted that above the level of the top plate 58 (particularly as shown in FIGURES 3 and 4) there is a clearance between the back side of the member 53 and the top plate 58, this clearance being equal to the thickness of the back plate 81 of the housing 51. This clearance is filled along the path of movement of member 53 by the rollers 61, but is also useful for providing a space for the stud 56 that is necessary for the operational setting of the female guide 21.

Figure 5:
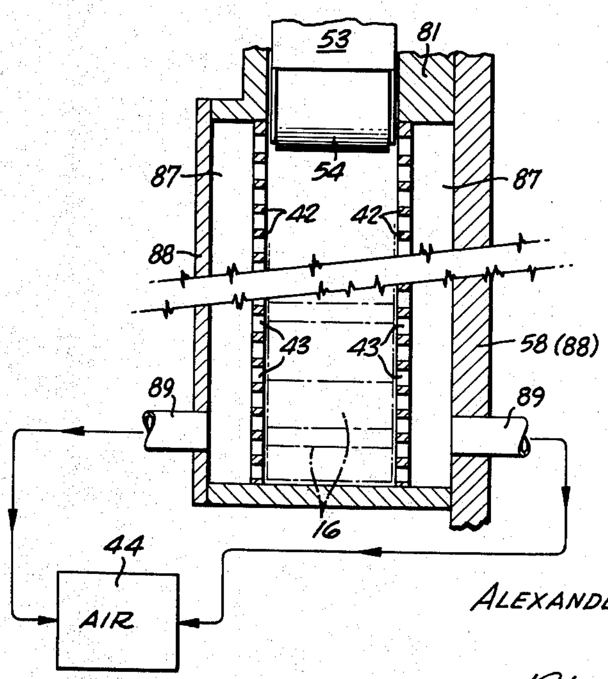
FIGURE 5 is a cross-sectional elevation view to an enlarged scale taken substantially on the plane of lines 5—5 of FIGURE 1.

Referring now to FIGURE 5, the preferred construction of the side walls 42 of the box 31 is further illustrated. Each of the side walls 42 has its vents 43 opening outwardly into a cavity 87 defined by a manifold 88 that covers the entire corresponding side wall 42 and all of the associated vents 43 thereof. A pair of conduits 89 leads from the manifolds 88 to the low pressure side of the air pressure means 44.

It will be seen that with this arrangement, the air pressure on both sides of any portion of the tape in box 31 is substantially the same, because both sides are equally available to the array of vents 43 spaced across the entire expanse of the side wall 42. Consequently it is clear that the minor amount of air that is actually present in the box 31 has no appreciable effect in tensioning the slack segment and that the entire tensioning of the tape outside the segment is accomplished by the air pressure directed through the upper portion of the channels 63–64 above described. It is further evident that whenever any one of the bends of the slack segment in the box 31 is shortened in such a way as to cause movement of the air enclosed by the bend, this air finds an immediate lateral escape route through the nearest vent 43 and does not have to be moved far in the direction of movement of the shortening bend. Furthermore, it will be seen that there is practically no danger whatsoever that the vents 43 disposed in the side of the tape box will be covered and plugged by any portion of the tape in such a way as to create a pressure differential causing the tape to adhere to the wall. Such a danger would exist if the vents were formed in the edge walls of the box so as to confront flat portions of the tape, but when formed in the lateral side walls of the box, the vents confront only the edges of the tape.

In addition to the advantages already listed, the folded conformation of the tape slack segment enables the storage of a greater quantity in the same space, with the result that the reels may be accelerated more slowly, and less powerful reel motors may be used. The slower acceleration of the reels also reduces the problem of reel tape pack inter-layer slippage, ordinarily caused by the impact of acceleration.

Thus, there has been described a device for maintaining a slack segment in a length of tensioned tape, in which air flow means are provided to maintain tension in the tape outside the segment, while the segment itself is formed in a folded condition to limt the amount of air enclosed by the moving bends of the segment when the segment is shortened, the folding of the tape also having the effect of crowding the shanks of the bends together and thus reducing the amount of air that must be accelerated when the segment is shortened; the device also including means for pumping air laterally away from the folded portion of tape so as to further decrease the air means linked therewith.

What is claimed is:

1. A device for maintaining a slack segment in a length of tensioned tape, comprising:
  means for tensioning the shanks of said segment toward one another so as to maintain tension in said tape outside said segment;
  means for forming at least one bend in said segment; and
  means including differential pressure means for limiting the amount of air impinging on each of the bends of said segment,
  whereby said segment may be shortened with minimum resistance from said air.

2. A device for maintaining a slack segment in a length of tensioned tape, comprising:
  means for guiding a flow of air along both sides of said tape at both shanks of said segment and toward the midpoint thereof so as to maintain tension in said tape outside said segment;
  means for venting said air laterally from both sides of each bend of said tape in said segment; and
  means for creating an air pressure differential decreasing from said guiding means to said venting means and including means for withdrawing said air from said venting means, so as to provide said air flow.

3. A device for maintaining a slack segment in a length of tensioned tape, comprising:
  means for guiding a flow of air along both sides of said tape at both shanks of said segment and toward the midpoint thereof so as to maintain tension in said tape outside said segment;
  means for holding said segment in folded condition so as to form a plurality of bends therein;
  means for venting said air laterally from both sides of every bend of said tape in said segment; and
  means for creating an air pressure differential decreasing from said guiding means to said venting means and including means for withdrawing said air from said venting means, so as to provide said air flow.

4. A device for maintaining a slack segment in a length of tensioned tape, comprising:
  tensioning and feeding means for said tape;
  means for guiding a flow of air along both sides of said tape at both shanks of said segment and toward the midpoint thereof so as to maintain tension in said tape outside said segment;
  a slack segment containing box having an interior width slightly greater than the width of said tape and positioned in line with said flow of air to receive and hold said tape segment in folded condition,
  said box having a pair of side walls encountered by the edges of said tape in said segment;
  said side walls being provided with vents spaced over the entire extent of said walls for venting said air laterally from both sides of said tape in said segment;
  means coupled to said box and to said tensioning and feeding means for sensing the amount of tape in said box and for operating said tensioning and feeding means to control the amount of tape in said box; and
  means for creating an air pressure differential decreasing from said guiding means to said vents so as to provide said air flow.

5. A device for maintaining a slack segment in a length of tensioned tape, comprising:
  tensioning and feeding means for said tape;
  differential acceleration and deceleration means for the mid-portion of said tape adjacent said slack segment;
  means for guiding a flow of air along both sides of said tape at both shanks of said segment and toward the midpoint thereof so as to maintain tension in said tape outside said segment;
  a tape slack segment containing box having an interior width slightly greater than the width of said tape and positioned in line with said flow of air to receive and hold said tape segment in folded condition;
  said box having a pair of side walls encountered by the edges of said tape in said segment;
  said side walls being provided with vents spaced over the entire extent of said walls for venting said air laterally from both sides of said tape in said segment;
  said box also being provided with a pair of manifold members covering said respective side walls and vents and defining a pair of cavities communicating with the interior of said box through said vents;
  means coupled to said box and to said tensioning and feeding means for sensing the amount of tape in said box and for operating said tensioning and feeding means so as to re-establish a predetermined amount of tape in said box whenever said amount is varied by said differential acceleration and deceleration means; and
  means for establishing an air pressure differential decreasing from said guide means to said vents so as to provide said air flow,
  said last-named means including vacuum means coupled to said manifold members for withdrawing said air therefrom.

6. A device for maintaining a slack segment in a length of tensioned tape, comprising:
  means for directing a flow of air along both sides of said tape at both shanks of said segment and toward the midpoint thereof so as to maintain tension in said tape outside said segment,
  said means including a housing defining a pair of elongated parallel channels enclosing said shanks of said segment,
  said channels having thresholds fitting around and conforming to said shanks and forming a seal against the pasage of air between said housing and shanks,
  said channels having enlarged portions immediately within said threshold and on both sides of said tape and being provided at said enlarged portions with air inlet means directed at both sides of said tape;
  means at the ends of said channels farthest from said thresholds for holding said segment in folded condition;
  means for venting said air laterally from both sides of said tape in said folded portion of said segment; and
  means for establishing an air pressure differential decreasing from said air inlet means to said venting means to provide said air flow.

7. A device for maintaining a slack segment in a length of tensioned tape, comprising:
  means for directing a flow of air along both sides of said tape at both shanks of said segment and toward the midpoint thereof so as to maintain tension in said tape outside said segment,
  said means including a housing defining a pair of elongated parallel channels enclosing said shanks of said segment,
  said channels having thresholds fitting around and conforming to said shanks and forming a seal against the pasage of air between said housing and shanks, said channels having enlarged portions immediately within said thresholds and on both sides of said tape and being provided at said enlarged portions with air inlet means directed at both sides of said tape, said channels being narrowed immediately inwardly from said enlarged portions and being shaped in gradually expanding and diverging form further inwardly so as to function as a pair of Venturi passages for the relative compression and expansion of said air flowing along said tape sides from said enlarged portions;

means at said ends of said channels opposite said thresholds for holding said segment in folded condition;

means for venting said air laterally from both sides of said tape in said folded portion of said segment; and means for establishing an air pressure differential decreasing from said air inlet means to said venting means to provide said air flow.

8. A device for maintaining a slack segment in length of tensioned tape, comprising:

means for directing a flow of air along both sides of said tape at both shanks of said segment and toward the midpoint thereof so as to maintain tension in said tape outside said segment, said means including a housing defining an elongated interior cavity that is open at both ends and a cooperating removable central island member inserted therein so as to define a pair of elongated parallel channels enclosing said shanks of said segment, said channels having thresholds fitting around and conforming to said shanks and forming a seal against the passage of air between said housing and shanks, said channels having enlarged portions immediately within said thresholds and on both sides of said tape and being provided at said enlarged portions with air inlet means directed at both sides of said tape;

means at the ends of said channels farthest from said thresholds for holding said segment in folded condition so as to form a plurality of bends therein;

means for venting said air laterally from both sides of said tape in said folded portion of said segment;

means for establishing an air pressure differential decreasing from said air inlet means to said venting means to provide said air flow; and means for selectively inserting and withdrawing said island member to respectively thread and free said tape segment in said device.

9. In a tape transport wherein motor means are employed to drive a pair of supply and takeup reels and to tension and transfer a length of tape between said reels and wherein capstan means are employed to provide differential acceleration and deceleration for a portion of the tape between said reels, a device for maintaining a slack segment in said length of tensioned tape between said reels, comprising:

means for directing a flow of air along both sides of said tape at both shanks of said segment and toward the midpoint thereof so as to maintain tension in said tape outside said segment, said means including a housing defining an elongated interior cavity open at both ends and a cooperating removable central island member inserted therein so as to define a pair of elongated parallel channels enclosing said shanks of said segment, said channels having thresholds fitting around and conforming to said shanks and forming a seal against the passage of air between said housing and shanks, said channels having enlarged portions immediately within said thresholds and on both sides of said tape and being provided at said enlarged portions with air inlet means directed at both sides of said tape, said channels being narrowed immediately inwardly from said enlarged portions and being shaped in gradually expanding and diverging form further inwardly so as to function as a pair of Venturi passages for the relative compression and expansion of said air flowing along said tape sides from said enlarged portions;

a tape slack segment containing box having an interior width slightly greater than the width of said tape and positioned in line with said flow of air to receive and hold said slack segment in folded condition, said box having a pair of side walls encountered by the edges of said tape in said segment, said side walls being provided with vents spaced over the entire extent of said walls for venting said air laterally from both sides of said tape in said folded portion of said segment, said box also being provided with a pair of manifold members covering said respective side walls and vents and defining a pair of cavities communicating with the interior of said box through said vents;

means coupled to said box and to said motor means for sensing the amount of tape in said box and for operating said motor means so as to re-establish a predetermined amount of tape in said box whenever said amount is varied by said capstan means;

means for creating an air pressure differential decreasing from said guiding means to said vents so as to provide said air flow, said last-named means including air pressurizing means having a high pressure side coupled to said air inlet means for supplying pressurized air thereto, and a low pressure vacuum side coupled to said manifold members for withdrawing said air therefrom; and means for selectively inserting and withdrawing said island member to respectively thread and free said tape segment in said device.

References Cited by the Examiner

UNITED STATES PATENTS

| | | | |
|---|---|---|---|
| 2,962,200 | 11/60 | Pouliart et al. | 226—95 |
| 2,979,244 | 4/61 | Pouliart et al. | 226—118 |

FOREIGN PATENTS

| | | |
|---|---|---|
| 847,821 | 9/60 | Great Britain. |

MERVIN STEIN, *Primary Examiner.*

HARRISON R. MOSELEY, *Examiner.*